United States Patent [19]

Kazumi et al.

[11] Patent Number: 4,774,534

[45] Date of Patent: Sep. 27, 1988

[54] DATA RECORDER FOR CAMERA

[75] Inventors: Jiro Kazumi, Kanagawa; Shinichi Tsujimoto, Tokyo, both of Japan

[73] Assignee: Canon Kabushiki Kaisha, Tokyo, Japan

[21] Appl. No.: 939,857

[22] Filed: Dec. 9, 1986

[30] Foreign Application Priority Data

Dec. 13, 1985 [JP] Japan ................................. 60-280677

[51] Int. Cl.$^4$ ............................................... G03B 7/24
[52] U.S. Cl. ...................................... 354/21; 354/412
[58] Field of Search ................................... 354/21, 412

[56] References Cited

U.S. PATENT DOCUMENTS

4,103,307 7/1978 Shinoda et al. ...................... 354/412
4,500,183 2/1985 Tanikawa ............................... 354/21

Primary Examiner—Michael L. Gellner
Attorney, Agent, or Firm—Fitzpatrick, Cella, Harper and Scinto

[57] ABSTRACT

In a data recorder for a camera having a data storing memory and control device for causing data to be recorded frame by frame for every photographed frame in the memory, film presence or absence discriminating device is arranged to inhibit data from being recorded in the data storing memory when the absence of the film is detected from a film detection signal received.

36 Claims, 6 Drawing Sheets

FLOW OF OPERATION OF CAMERA CONTROL CKT

FIG.3 (B)

FLOW OF OPERATION OF CPU

DATA RECORDER FOR CAMERA

BACKGROUND OF THE INVENTION

1. Field of the Invention

The present invention relates to an improvement of a data recorder for a camera arranged to automatically record frame by frame, for every photographed frame, such data as a shutter speed or time, automatic controlled aperture value, etc.

2. Description of the Related Art

Professional or semi-professional photographers in general make it a rule to record conditions under which a picture is taken for every frame of film, including such data as a shutter speed, an aperture value, etc. Generally, such data is written on a recording paper sheet for every photographed frame. However, such a recording method is not only troublesome but tends to have the recording paper lost to prevent the recording of photographic data (indicative of photographing conditions) from being adequately kept. To solve this problem, it has been proposed to have these data stored by an electric storage device such as a computer or the like in a manner, for example, as disclosed in U.S. Pat. No. 4,103,307 and Japanese Laid-Open Patent Application Nos. Sho 53-116146, Sho 59-68726, Sho 60-254123, etc.

In accordance with these prior art methods, however, the camera records data even in the event of no-load shooting or trial or demonstration shooting made without loading the camera with any film at a camera store or on such occasions as a camera show or the like. After that, when a photographing operation is actually performed, either the data recording might become impossible with the data storage capacity having been used up or the data record might become misleading to confuse rearrangement or readjustment of data to be made later on with the actual photographic data commingled with the data unnecessarily recorded during the no-load shooting.

SUMMARY OF THE INVENTION

It is a purpose of this invention to provide a data recorder which is capable of effectively using a data memory to solve the above-stated problems of the prior art recorder.

To attain this object, in accordance with this invention, film presence/absence discriminating means is arranged to inhibit data from being recorded in a data storing memory when the absence of film is detected from an incoming film presence/absence detection signal. Therefore, only the data obtained when the film is actually exposed to light is stored in the data memory.

The above and other objects and features of the invention will become apparent from the following detailed description of embodiments thereof taken in connection with the accompaning drawings.

DETAILED DESCRIPTION OF THE PREFERRED EMBODIMENTS

Figure 1:
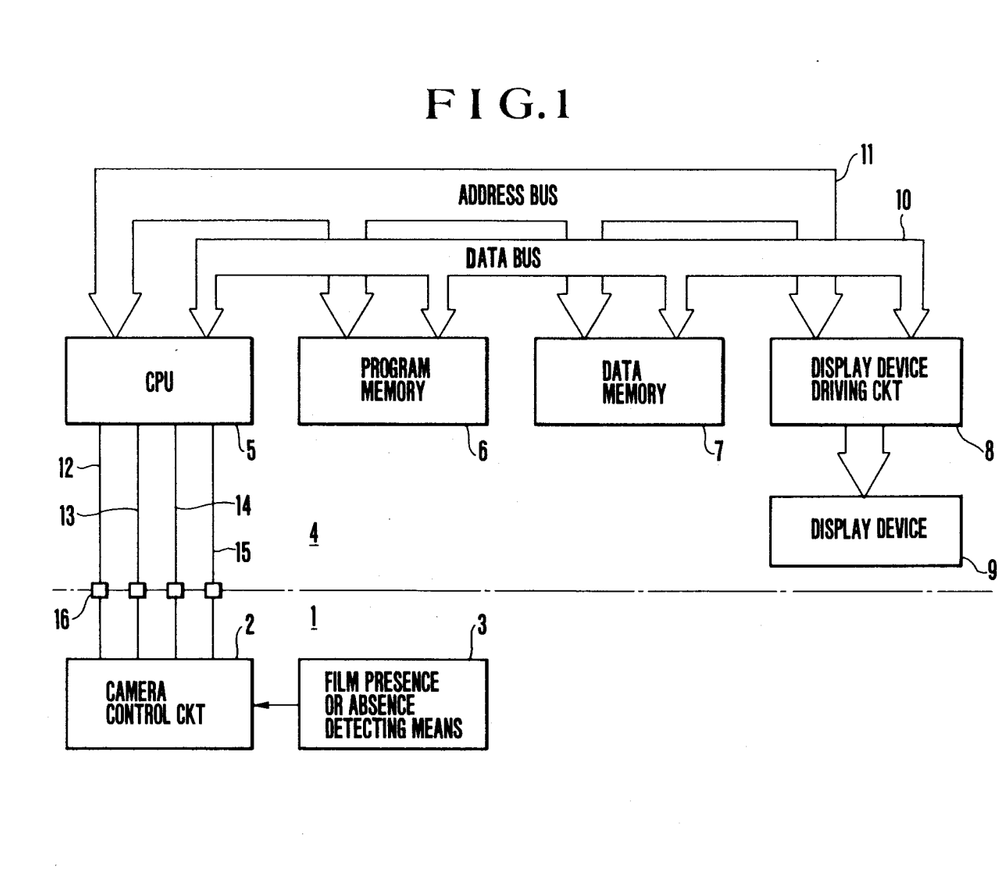
FIG. 1 is a block diagram showing one embodiment of this invention.
Figure 2:
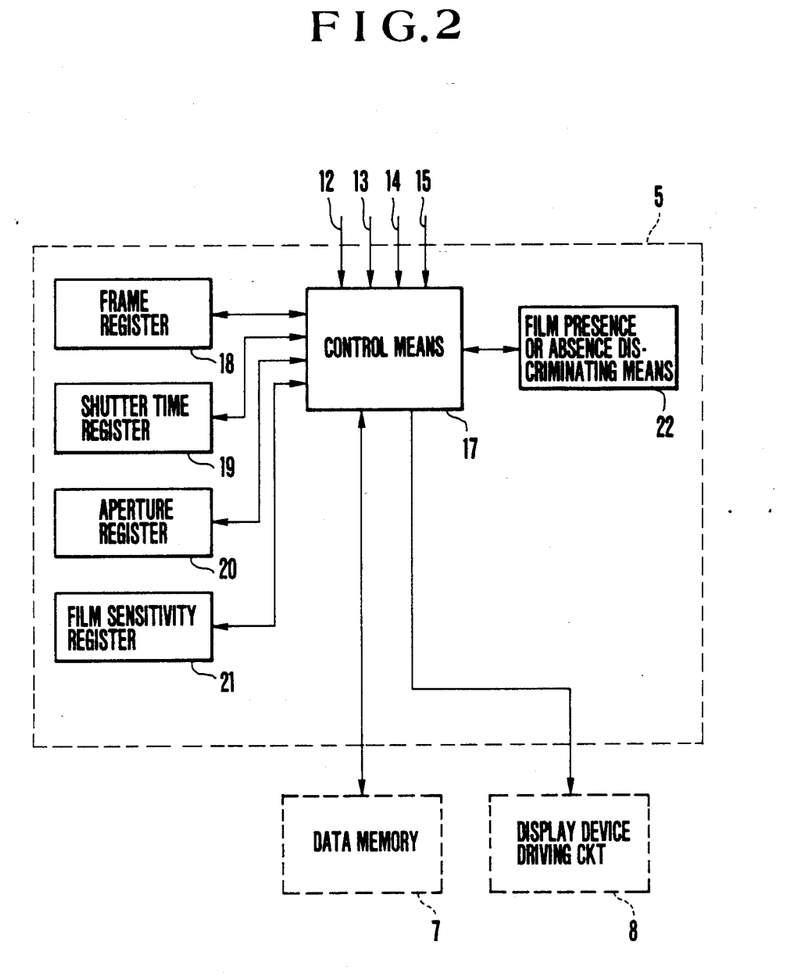
FIG. 2 is a block diagram showing the functions of a CPU employed in the embodiment.

The following description covers an embodiment of this invention with reference to the accompanying drawings, wherein: FIG. 1 is a block diagram showing the arrangement of the embodiment. A camera body 1 which is shown below a one-dot-chain line includes a camera control circuit 2 and film presence or absence detecting means 3. A part of the drawing above the one-dot-chain line represents a data recorder 4 which is, for example, mounted on the lid of the camera body 1. The data recorder 4 includes a CPU 5; a program memory 6 such as a ROM or the like; a data memory 7 such as a RAM or the like; a display device driving circuit 8; and a display device 9 which is a liquid crystal display device or the like. The CPU 5, the program memory 6, the data memory 7 and the display device driving circuit 8 are interconnected by a data bus 10 and an address bus 11. The CPU 5 is connected to the camera control circuit 2 by a data line 12, a trigger signal line 13, a clock signal line 14, a grounding line 15, etc. through connecting terminals 16. FIG. 2 shows the functions of the CPU relating to this invention. Referring to FIG. 2, the CPU 5 is provided with control means 17; a register 18 for frames; a register 19 for a shutter time value; a register 20 for an aperture value; a register 21 for a film sensitivity value; and film presence or absence discriminating means 22. The operation of the embodiment is as described below:

The film presence or absence detecting means 3 is arranged to detect the presence or absence of the film within the camera. A detection signal produced from the means 3 is supplied to the camera control circuit 2. As shown in a flow chart in FIG. 3(A), the camera control circuit 2 is arranged to supply the CPU 5 with information on the number of frames indicating the number assigned to a frame for which a shutter release operation of the camera is presently performed in association with the release operation with the presence of the film confirmed through the film detection signal from the detecting means 3. If the camera is not loaded with any film, the camera control circuit 2 supplies the CPU 5 with data indicative of "0" (zero) as the frame number information. After the frame number information, the control circuit 2 supplies the CPU 5 with exposure control data including shutter time, data, or aperture data and film sensitivity (ISO) data, etc.

Figure 3:
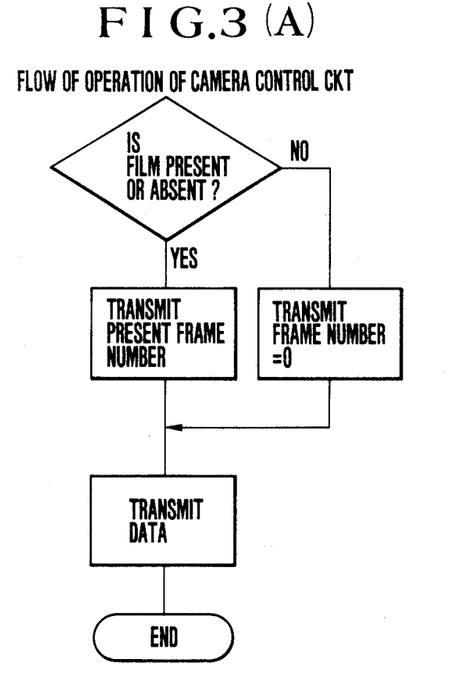
FIGS. 3(A) and 3(B) are flow charts showing the operations of the embodiment.

The operation of the CPU 5 is as shown in the flow chart of FIG. 3(B). Upon receipt of data from the camera control circuit 2, the control means 17 causes the frame register 18 to store the frame number data; the shutter time register 19 to store the shutter time data; the aperture register 20 to store the aperture data; the film sensitivity register 21 to store the film sensitivity data; and other data to be stored by some other applicable register which is not shown. After that, the control means 17 takes out the frame number data from the frame register 18 and sends it to the film presence or absence discriminating means 22. Upon receipt of the data, the discriminating means 22 determines the film to be present and allows the control means 17 to have the data recorded into the data memory 7 if the data indicates any frame number other than zero. More specifically, the control means 17 then takes out data from the registers 18 to 21 one after another and sends the data to the data memory 7 for recording. At the same time, the display device driving circuit 8 is actuated to have the display device 9 display the data thus obtained.

If the frame number is zero, the film presence or absence discriminating means 22 determines the film to be absent and inhibits the control means 17 from causing data recording into the data memory 7. In other words, although the control means 17 in this instance takes out data from the registers 18 to 21 one after another, the means 17 does not supply the data to the data memory 7 and sends the data only to the display device driving circuit 8 to have the data displayed by the display device 9.

Figure 4:
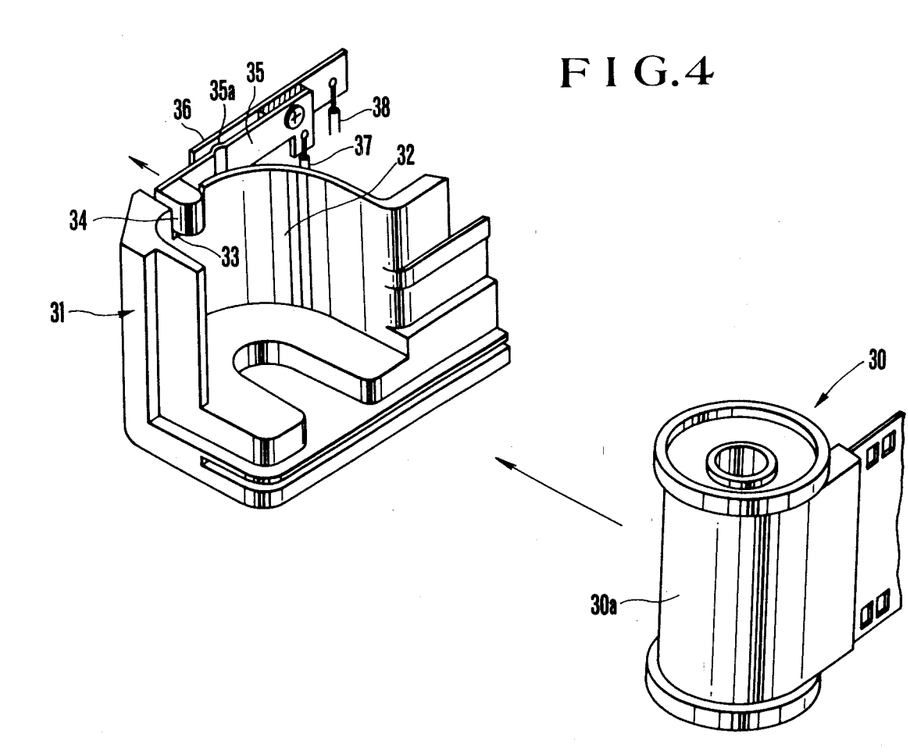
FIG. 4 is an oblique view showing an example of means for detecting the presence or absence of film.

FIGS. 4 to 6(B) show different arrangement examples of the film presence or absence detecting means 3. FIG. 4, shows one example wherein the presence or absence of film is arranged to be determined by detecting the presence or absence of a cartridge 30a containing the film 30. The illustration includes a camera body 31 which is shown only in part including a cartridge chamber 32 and parts around it. The cartridge chamber 32 is provided with a cut-out part 33. A cartridge switch 34 protrudes from the cut-out part 33. When the film cartridge 30a is placed within the chamber 32, the cartridge switch 34 is pushed by the cartridge 30a. Then, a conductive plate spring 35 which is arranged in one body with the switch 34 has its protrudent part 35a come into contact with a conductive metal piece 36. The plate spring 35 and the lead wires 37 and 38 of the metal piece 36 are connected to the camera control circuit 2 (see FIG. 1). Information on the detection of the presence of the cartridge 30a through the contact of the plate spring 35 and he metal piece 36 is thus transmitted to the camera control circuit 2.

Figure 5A:
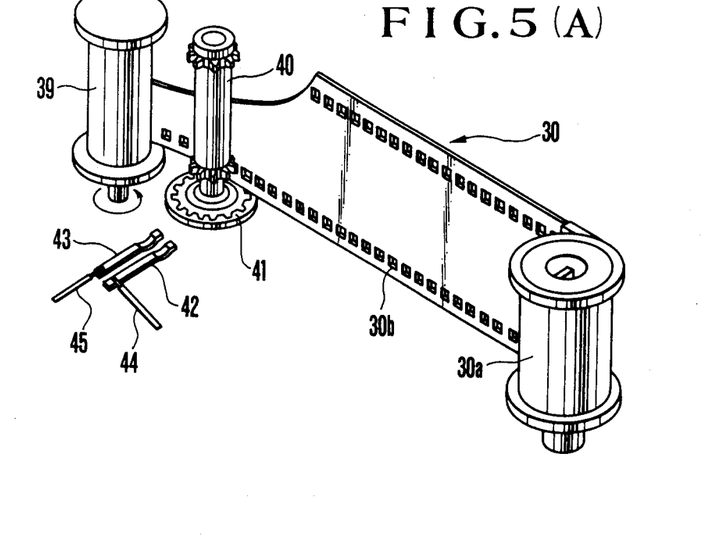
FIGS. 5(A) and 5(B) show in an oblique view and a plan view another example of the film presence or absence detecting means.
Figure 5B:
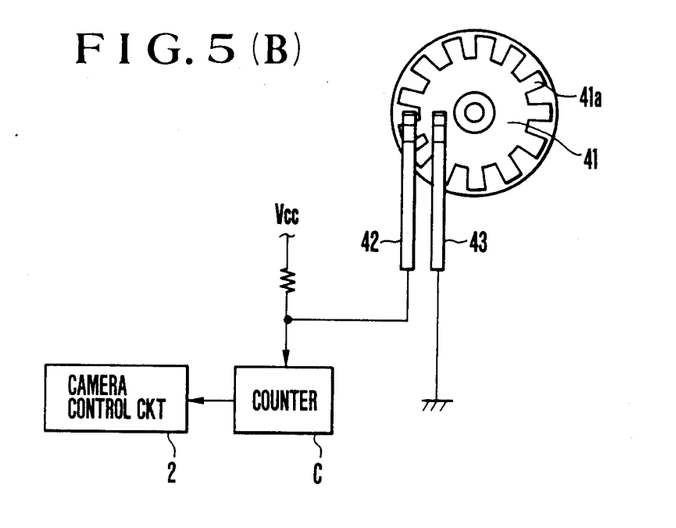
Figure 6:
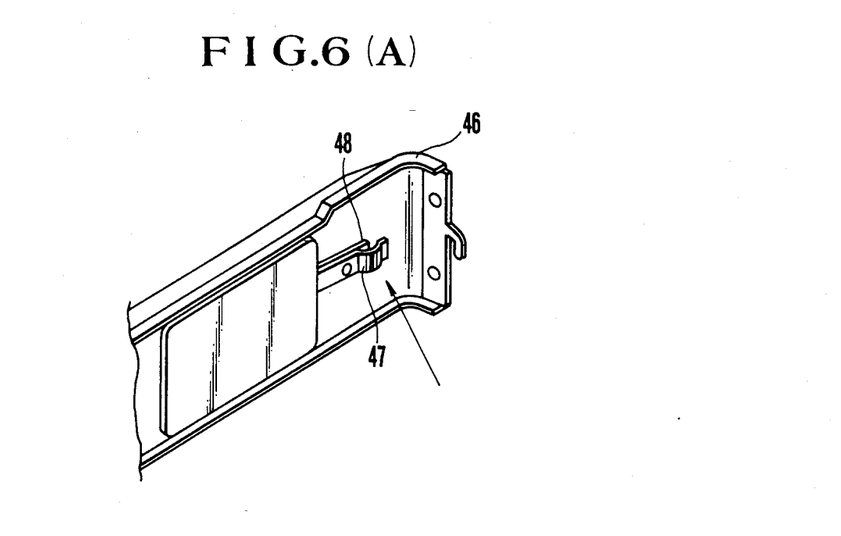
FIGS. 6(A) and 6(B) show in an oblique view and a plan view still another example of the film presence or absence detecting means.

FIGS. 5(A) and 5(B) show another example of arrangement of detecting the presence or absence of film. In this case, the presence of the film is arranged to be detected through a normal film feeding state of the camera. There is a possibility that an accurate film feeding operation cannot be ensured by mere detection of the presence of the film cartridge. In the case of this example, the film presence detection can be made more accurately than in the example shown in FIG. 4. Further, the arrangement of FIGS. 5(A) and 5(B) may be made in combination with that of FIG. 4. Referring to FIG. 5(A), the illustration includes a film 30; a film cartridge 30a; the perforation 30b of the film 30; and a spool 39. A motor which is not shown is arranged to take up the film 30 on the spool 39 by rotating the latter in the direction of an arrow. A sprocket 40 is arranged to rotate accordingly by engaging the film perforation 30b as the film 30 moves. In this instance, the sprocket 40 is moved by the movement of the film 30. A pulse plate 41 is arranged in one unified body with the sprocket 40. The pulse plate 41 is provided with an indented part 41a as shown in FIG. 5(B). An electrode contact piece 42 is arranged to come into contact with the indented part 41a of the pulse plate 41. Another electrode contact piece 43 is arranged to be constantly in contact with the pulse plate 41. The pulse plate 41 is kept at a predetermined potential level by the electrode contact piece 43 (for example, the plate 41 is kept at a ground level). The lead wires 44 and 45 of the electrode contact pieces 42 and 43 are connected via a counter C to the camera control circuit 2.

When the film 30, is fed, the sprocket 40 and the pulse plate 41 rotate. The electrode contact piece 42 then repetitively turns on and off relative to the electrode contact piece 43. The number of turning on and off actions of the contact piece 42 is read by the counter C, detecting whether or not the film is fed in a normal manner. The counter C produces a film presence indicating signal and supplies it to the camera control circuit 2 only when the film 30 is brought into a photographing position by a normal film feeding operation. Then, photographic data is recorded at the data memory 7 in response to an ensuing shutter release operation. In this case, the data memory 7 can be saved from being wastefully operated not only in the absence of the film cartridge but also in the case where the film 30 is not normally fed.

FIGS. 6(A) and 6(B) show a further example, in which the presence or absence of the film cartridge is arranged to be detected from on the side of the back lid of the camera. When the lid 46 is closed after the camera has been loaded with the film cartridge, contact pieces 47 and 48 come into contact with each other. The switch consisting of the contact pieces 47 and 48 is thus arranged to be closed only in the presence of the film cartridge to permit detection thereof. The lead wires 49 and 50 of these contact pieces 47 and 48 are connected to the camera control circuit 2.

Again, referring to FIGS. 5(A) and 5(B), during the process of no-load feeding (or a feeding operation without film), the counter C supplies the CPU 5 with data representing zero number of frame. Therefore, in this way, data is prevented from being recorded into the data memory 7 not only in the case of the absence of the film but also in the event of a no-load feeding operation.

Further, the data recording operation does not have to be accomplished in association with the shutter release operation of the camera but may be arranged to be accomplished in association with a film winding operation. In cases where the camera control circuit 2 is arranged to store data for several frames at a memory provided on the side of the camera and to transmit all the stored data at a time, the data is recorded at the time of transmission, irrespective of the shutter release or film winding operation of the camera.

In the case of the embodiment described when the data relative to the presence or absence of film is included in the data representing the number of frames, the film data may be either arranged to be included in some other data or discretely arranged as independent data. Further, the display device 9 may be arranged to display the remainder of the recordable capacity of the data memory 7 (as reduced to the form of a remaining number of frames). The film presence or absence detecting means may be disposed on the side of the data recorder instead of on the side of the camera.

An optical detecting means may be employed as the film presence or absence detecting means instead of the electrical switching means.

The data recorder 4 does not have to be disposed on the lid of the camera but may be disposed in some other suitable part. For example, it may be arranged in the bottom part of the camera or may be arranged away from the camera with electrical connection to the camera.

In accordance with this invention, as described in the foregoing, the film presence or absence discriminating means is arranged to inhibit any data recording action on the data memory when the absence of film is found from an incoming film presence or absence detecting signal; and the data memory is allowed to have only the data that is obtained when the film is actually exposed to light. Therefore, the invented arrangement permits highly efficient use of the data memory. The invention thus has an extremely high degree of utility.

What is claimed is:

1. A data recorder for a camera, comprising:
   (a) memory means for recording photographic data, said memory means remaining stationary with respect to the camera in response to the loading or unloading of photosensitive material in or from the camera;
   (b) control means for causing said photographic data to be recorded in said memory means frame by frame for every photographed frame; and
   (c) discriminating means for discriminating the loaded or unloaded state of the photosensitive material, said discriminating means being arranged to inhibit said control means from causing said photographic data to be recorded frame by frame in said memory means when the unloaded state of said photosensitive material is discriminated.

2. A data recorder according to claim 1, wherein said photosensitive material is housed in a film cartridge, and wherein said discriminating means includes film cartridge detecting means for detecting whether said film cartridge is loaded in the camera.

3. A data recorder according to claim 2, wherein the camera comprises a film cartridge chamber, and wherein said film cartridge detecting means is disposed within said film cartridge chamber of the camera.

4. A data recorder according to claim 2, wherein the camera comprises a lid for loading and unloading said film cartridge, and wherein said film cartridge detecting means is disposed on said lid.

5. A data recorder according to claim 1, wherein said control means includes photographic frame member detection means which is arranged to prevent said frame-by-frame photographic data from being recorded in said memory means in the event that the number of the photographing frame is zero.

6. A data recorder according to claim 5, wherein said discriminating means is arranged to produce and supply a signal indicative of a photographing frame number of zero to said control means in response to discrimination of the unloaded state of said photosensitive material.

7. A data recorder according to claim 1, wherein said discriminating means includes frame feed confirming means arranged to inhibit said control means from causing said frame-by-frame photographic data to be recorded in said memory means until said photosensitive material is fed by a predetermined amount.

8. A data recorder according to claim 1, further comprising display means for displaying said photographic data.

9. A data recorder according to claim 8, wherein said display means is arranged to display said photographic data even when said photographic data is not recorded in said memory means.

10. A photographic information recording device for a camera, comprising:
    (a) memory means for recording phoographic information, said memory means remaining stationary with respect to the camera in response to the loading or unloading of photosensitive means in or from the camera;
    (b) control means for causing said photographic information to be recorded in said memory means; and
    (c) disciminating means for discriminating the loaded or unloaded state of the photosensitive material, said discriminating means being arranged to inhibit said photographic information from said recorded in said memory means in response to discrimination of the unloaded state of said photosensitive material.

11. A device according to claim 10, wherein the photosensitive material is contained in a film cartridge, and wherein said discriminating means includes detecting means for detecting a loaded or unloaded state of said film cartridge.

12. A device according to claim 11, wherein the camera includes a film cartridge chamber, and wherein said detecting means is disposed within the film cartridge chamber of said camera.

13. A device according to claim 11, wherein the camera comprises a lid for loading and unloading of the film cartridge and wherein said detecting means is disposed on said lid.

14. A device according to claim 10, wherein said control means includes photographing frame number detection means which is arranged to prevent said photographic information from being recorded in said memory means in the event that the number of the photographing frame is zero.

15. A device according to claim 14, wherein said discriminating means is arranged to produce and supply a signal indicative of a photographing frame number of zero to said control means in response to discrimating of the unloaded state of said photosensitive material.

16. A device according to claim 10, wherein said discriminating means includes frame feed confirming means arranged to inhibit said control means from causing said photographic information to be recorded in said memory means until said photosensitive material is fed in a predetermined amount.

17. A device according to claim 19, further comprising display means for displaying said photographic information.

18. A device according to claim 17, wherein said display means is arranged to display said photographic information even when said photographic information is not recorded in said memory means.

19. A camera system, comprising:
    (a) memory means for memorizing data, said memory means being undisplaced in response to displacement of a photosensitive material with respect to said camera system or being non-integral with the photosensitive material;
    (b) control means for causing data for every photographed frame to be memorized in said memory means; and
    (c) discriminating means for discriminating a loaded or unloaded state of the photosensitive material, said discriminating means being arranged to inhibit said control means form causing said data to be memorized in said memory means when the unloaded state of said photosensitive material is discriminated.

20. A camera system according to claim 19, wherein the photographic material is housed in a film cartridge, and wherein said discriminating means includes film cartridge detecting means for detecting whether said film cartridge is loaded in or unloaded from said camera system.

21. A camera system according to claim 20, wherein said camera system has a film cartridge chamber for storing the film cartridge, and wherein said film cartridge detecting means is disposed within said film cartridge chamber of said camera.

22. A camera system according to claim 20, further comprising a lid for loading and unloading the film cartridge, wherein said film cartridge detecting means is disposed on said lid.

23. A camera system according to claim 19, wherein said control means includes photographing frame number detection means which is arranged to prevent said data from being memorized in said memory means in the event that the number of the photographing frame is zero.

24. A camera system according to claim 23, wherein said discriminating means is arranged to produce and supply a singal indicative of a photographing frame number of zero to said control means in response to discrimination of the unloaded state of said photosensitive material.

25. A camera system according to claim 19, wherein said discriminating means includes frame feed confirming means arranged to inhibit said control means from causing said data to be memorized in said memory means until the photosensitive material is fed in a predetermined amount.

26. A camera system according to claim 19, further comprising display means for displaying said data.

27. A camera system according to claim 26, wherein said display means is arranged to display said data when said data is not memorized in said memory means.

28. A camera system, comprising:
(a) memory means for memorizing information, said memory means being undisplaced in response to displacement of a photosensitive material with respect to said camera system or being non-integral with the photosensitive material;
(b) control means for causing said information to be memorized in said memory means; and
(c) discriminating means for discriminating a loaded or unloaded state of the photosensitive material, said discriminating means being arranged to inhibit said information from being memorized in said memory means in response to discrimination of the unloaded state of said photosensitive material.

29. A camera system according to claim 28, wherein the photosensitive material is housing in a cartridge and wherein said discriminating means includes detecting means for detecting a loaded or unloaded state of the cartridge.

30. A camera system according to claim 29, wherein said camera system has a cartridge chamber for storing the cartridge, and wherein said detecting means is disposed within the cartridge chamber of said camera.

31. A camera system according to claim 29, further comprising a lid for loading and unloading the cartridge, wherein said detecting means is disposed on said lid.

32. A camera system according to claim 28, wherein said control means includes photographing frame number detecting means which is arranged to prevent said information from being memorized in said memory means in the event that the number of the photographing frame is zero.

33. A camera system according to claim 32, wherein said discriminating means is arranged to produce and supply a signal indicative of a photographing frame number of zero to said control means in response to discrimination of the unloaded state of the photosensitive material.

34. A camera system according to claim 28, wherein said discriminating means includes frame feed confirming means arranged to inhibit said control means from causing said information to be memorized in said memory means until the photosensitive material is fed in a predetermined amount.

35. A camera system according to claim 28, further comprising display means for displaying said information.

36. A camera system according to claim 35, wherein said display means is arranged to display said information when said information is not memorized in said memory means.

* * * * *

UNITED STATES PATENT AND TRADEMARK OFFICE
CERTIFICATE OF CORRECTION

PATENT NO. : 4,774,534

DATED : September 27, 1988

INVENTOR(S) : Kazumi, et al.

It is certified that error appears in the above-identified patent and that said Letters Patent is hereby corrected as shown below:

COLUMN 1

Line 57, "accompaning" should read --accompanying--.

COLUMN 3

Line 20, "4," should read --4--; and

Line 37, "he" should read --the--.

COLUMN 4

Line 3, "film 30," should read --film 30--;

Line 33, "Therefore, in" should read --In--; and

Line 47, "described" should read --described,--.

COLUMN 5

Line 40, "photographic frame member" should read --photographing frame member--; and Line 66, "phoagraphic" should read --photographic--.

UNITED STATES PATENT AND TRADEMARK OFFICE
CERTIFICATE OF CORRECTION

PATENT NO. : 4,774,534　　　　　　　　　　　Page 2 of 3

DATED : September 27, 1988

INVENTOR(S) : Kazumi, et al.

It is certified that error appears in the above-identified patent and that said Letters Patent is hereby corrected as shown below:

COLUMN 6

Line 1, "photosensitive means" should read

--photosensitive material--;

Line 6, "disciminating" should read --discriminating--;

Line 9, "said recorded" should read --being recorded--;

Line 35, "discrimating" should read --discrimination--;

Line 43, "claim 19," should read --claim 10,--;

Line 62, "form" should read --from--; and

Line 67, "photographic material" should read

--photosensitive material--.

COLUMN 7

Line 22, "singal" should read --signal--.

UNITED STATES PATENT AND TRADEMARK OFFICE
CERTIFICATE OF CORRECTION

PATENT NO. : 4,774,534

DATED : September 27, 1988

INVENTOR(S) : Kazumi, et al.

It is certified that error appears in the above-identified patent and that said Letters Patent is hereby corrected as shown below:

COLUMN 8

Line 8, "housing" should read --housed--; and

Line 22, "detecting means" should read

--detection means--.

Signed and Sealed this

Twenty-fifth Day of July, 1989

Attest:

DONALD J. QUIGG

Attesting Officer

Commissioner of Patents and Trademarks